United States Patent
Ooiwa

(10) Patent No.: US 7,196,497 B2
(45) Date of Patent: Mar. 27, 2007

(54) VEHICLE-MOUNTED ELECTRICAL GENERATING SYSTEM IN WHICH FIELD CURRENT OF ELECTRIC GENERATOR SUPPLYING POWER TO HIGH-VOLTAGE SYSTEM IS DERIVED FROM SUPPLY VOLTAGE OF LOW-VOLTAGE SYSTEM

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 124 days.

(21) Appl. No.: 11/153,615

(22) Filed: Jun. 16, 2005

(65) Prior Publication Data
US 2005/0280400 A1    Dec. 22, 2005

(30) Foreign Application Priority Data
Jun. 17, 2004   (JP)   ............... 2004-179286

(51) Int. Cl.
*H02P 9/10*   (2006.01)
*H02P 9/02*   (2006.01)

(52) U.S. Cl. .............. 322/22; 322/25; 322/59

(58) Field of Classification Search ........... 322/22, 322/23, 24, 25, 28, 59, 99
See application file for complete search history.

(56) References Cited

U.S. PATENT DOCUMENTS

| | | | |
|---|---|---|---|
| 5,166,538 A * | 11/1992 | Norton ................. 307/10.1 |
| 5,214,371 A * | 5/1993 | Naidu ................... 322/29 |
| 5,418,401 A * | 5/1995 | Kaneyuki ............. 307/10.1 |
| 5,606,246 A * | 2/1997 | Adachi ................. 322/8 |
| 5,731,690 A * | 3/1998 | Taniguchi et al. ..... 322/28 |
| 6,111,768 A * | 8/2000 | Curtiss ................. 363/98 |
| 6,323,608 B1 * | 11/2001 | Ozawa ................. 318/139 |
| 6,351,104 B1 * | 2/2002 | Koelle et al. ......... 322/22 |
| 6,476,571 B1 * | 11/2002 | Sasaki ................. 318/139 |
| 6,504,346 B2 * | 1/2003 | Nakamura et al. .... 322/90 |
| 6,555,992 B2 * | 4/2003 | Asao et al. ............ 322/28 |
| 6,661,109 B2 | 12/2003 | Fukasaku et al. |
| 2001/0019210 A1 | 9/2001 | Fukasaku et al. |
| 2001/0042649 A1 | 11/2001 | Maeda et al. |

FOREIGN PATENT DOCUMENTS

JP    A 2001-333507    11/2001

* cited by examiner

*Primary Examiner*—Nicholas Ponomarenko
(74) *Attorney, Agent, or Firm*—Oliff & Berridge, PLC

(57) ABSTRACT

A vehicle-mounted electrical generating system has a first voltage system which operates from a high supply voltage and a second voltage system which operates from a low supply voltage that is substantially constant, and an electrical generator for supplying power to operate the first voltage system at a voltage determined by the level of field current of the generator, with the field current being derived from the low supply voltage of the second voltage system. The specifications of the field winding of the electrical generator can thereby be optimally established irrespective of the value of the high supply voltage.

7 Claims, 3 Drawing Sheets

VEHICLE-MOUNTED ELECTRICAL GENERATING SYSTEM IN WHICH FIELD CURRENT OF ELECTRIC GENERATOR SUPPLYING POWER TO HIGH-VOLTAGE SYSTEM IS DERIVED FROM SUPPLY VOLTAGE OF LOW-VOLTAGE SYSTEM

CROSS-REFERENCE TO RELATED DOCUMENT

This application is based on and incorporates herein by reference Japanese Patent Application No. 2004-179286 filed on Jun. 17, 2004.

BACKGROUND OF INVENTION

1. Field of Application

The present invention relates to a vehicle-mounted electrical generating system having two voltage systems that operate at respectively different voltages.

2. Description of Prior Art

In recent years, as requirements have arisen for vehicle electrical generating systems capable of to supplying power to an electrical load at a high voltage, in addition to supplying power at the low voltage of a conventional vehicle electrical generating system, types of vehicle-mounted electrical generating system have been proposed which incorporate multiple-voltage power sources. An example of such a prior art proposal is in Japanese patent publication No. 2001-333507 (pages 4 to 10, FIGS. 1 to 18). In that patent, a vehicle-mounted electrical generating system is proposed having two electric generators; a first generator which supplies power to a load that is rated at approximately 12 V, and a second generator which supplies an output voltage that varies over a wide range, from high to low values. The function of the second electric generator is to supply power to a DC motor that drives the rear wheels of the vehicle, with that generator producing a DC supply voltage which can vary within a range extending up to 50 V, for example. The respective outputs of the first and second electric generators are in effect connected in parallel (although mutually isolated by diodes) for supplying the field current of the field winding of the second electric generator (more specifically, the field winding of the alternator of the second electric generator). That is, the field current is supplied from the first electric generator or the battery (at the approximately 12 V battery voltage) when the output voltage of the second electric generator is lower than the battery voltage, and is supplied from the output of the second electric generator itself when that output voltage is higher than the battery voltage.

With an electric generator, when the density of magnetic flux in the magnetic circuit of the generator is low, any increase in the amount of magnetic excitation (i.e., resulting from an increase in the field current) will result in an increase in the magnetic flux density. However when the magnetic flux density reaches a certain level, no increase in the flux density will be produced by increasing the degree of magnetic excitation. That is to say, at a certain value of ampere-turns of magnetic excitation force, the output electrical power of the generator will not increase beyond a specific saturation value as the field current is increased, due to magnetic saturation in the magnetic circuits of the windings of the generator.

For that reason, it is preferred practice to design an electric generator to have a field winding with a value of resistance and number of turns such that saturation of the magnetic flux density occurs when a specific maximum field current is passed, and to operate the electric generator as far as possible such that the field current is maintained substantially close to that maximum value at which saturation begins to occur.

However in the case of the second electric generator of the above prior art example, the range of variation of the voltage applied to the field winding (i.e., when that is the output voltage of the second electric generator itself) is large, so that it is not possible to design the field winding such that the aforementioned condition that the field current be close to the saturation value will be maintained under various different operating conditions.

Furthermore, in order to reduce the amount of heat that is generated in the field winding of the second electric generator and in a switching element (in general, an FET) that controls the field current of that electric generator, it is necessary to establish a high value of resistance for the field winding of the second generator, in order to limit the maximum current that will flow through the field winding and the switching element when a maximum value of output voltage is being produced by the second electric generator.

Hence, it is not possible to utilize a field winding having a low value of resistance, in order to achieve a high value of magnetic excitation. In addition, the inductance of the field winding becomes large, so that delays occur in effecting changing of the level of magnetic excitation of the field winding by on/off switching control of the field current. Moreover, due to the high inductance of the field winding, high levels of electrical noise and large-amplitude voltage surges are produced by the second electric generator.

In particular, when the second electric generator is driving a large electrical load, high-amplitude voltage spikes will appear in the output voltage of that electric generator each time that the load is disconnected from the output terminals of the generator. These voltage spikes can damage a regulator (i.e., voltage control apparatus) that controls the switching element of the field winding of the second electric generator, or damage the rectifier circuit of that generator.

Furthermore with the second electric generator of the above prior art example, due to the fact that a high voltage is applied to the field winding, components such as the brushes and slip rings which transfer the field current to the field winding and which are exposed to the atmosphere, are subject to corrosion, due to intrusion of dust particles, etc., caused by the high voltage. Hence, such an electric generator has a low resistance to the adverse effects of the generator environment. This is especially true when the electric generator is a fan-cooled type, in which a flow of cooling air is passed through the interior of the generator.

SUMMARY OF THE INVENTION

It is an objective of the present invention to overcome the above problems of the prior art, by providing vehicle-mounted electrical generating system which is resistant to the adverse effects of the environment, and whereby only low levels of electrical noise and low-amplitude voltage surges are produced in an output voltage of the generator.

To achieve the above objectives, the present invention provides a vehicle-mounted electrical generating system that includes a first voltage system which operates at a high supply voltage, a second voltage system which operates at a low supply voltage, a first electric generator having a rotor with a field winding wound thereon, with the rotor being driven to generate electrical power that is supplied to the first voltage system, and a voltage control apparatus which controls the field current of the field windings such as to regulate the supply voltage of the first voltage system to a predetermined value. The system of the invention is characterized in that the voltage control apparatus operates from electrical power supplied from the second voltage system at the low supply voltage, and in that the field current of the first electric generator is derived from the low supply voltage of the second voltage system.

In that way, it is ensured that only low values of voltage (e.g., typically approximately 14 V) are applied to those components of the first electric generator such as brushes, slip rings, etc., that are exposed to the atmosphere. Hence greater durability of these components, due to lower levels of corrosion, can be achieved when the first electric generator is operated under adverse environmental conditions, such as the condition of high levels of dust, corrosive gases, etc., within an engine compartment of a vehicle. The improvement in durability is especially significant in the case of an electric generator in which a fan-impelled flow of cooling air passes through the interior of the generator.

Furthermore, due to the fact that only low values of voltage are applied between the terminals of the field winding, the resistance of the field winding can be made low, enabling high levels of field current to be utilized without the danger of excessive heat generation, so that the output power of the first electric generator can be increased, by comparison with a prior art type of such generator in which the high output voltage of the electric generator itself is applied to the field winding.

Moreover due to the fact that the field winding can have a low value of inductance, levels of electrical noise and voltage surges in the output supply voltage of the generator, occurring in particular when a heavy load is disconnected from the output of the generator, can be made low.

From another aspect, such a vehicle-mounted electrical generating system can be configured with an input of the voltage control apparatus connected to the output terminal of the first electric generator (i.e., from which the output voltage of that generator is transferred to the first voltage system) via an internal connecting lead of the first electric generator. The voltage control apparatus controls the first electric generator to maintain the potential of the internal connecting lead at a predetermined value, based on comparing the voltage level at the aforementioned input terminal with the predetermined value. In that way, that internal connecting lead, and the means for electrically connecting the input terminal of the voltage control apparatus to that internal connecting lead, are all contained in the interior of the first electric generator and so can be sealed off from the atmosphere. Thus, the internal connecting lead, and the means for electrically connecting the voltage control apparatus to that internal connecting lead, will not be subjected to corrosion, etc., due to environmental factors, so that increased durability and higher reliability can be achieved.

Alternatively, an input terminal of the voltage control apparatus may be connected to an electrical load within the first voltage system via an external connecting lead, with the voltage control apparatus applying control to maintain the potential of that external connecting lead at a predetermined value, and so directly control the supply voltage that is actually being applied to the electrical load of the first voltage system. The external connecting lead is preferably connected to the first electric generator and to the voltage control apparatus by means of respective sealed connectors. In that way it becomes possible to substantially eliminated the effects of an adverse operating environment such as corrosion, etc., on the reliability of the link whereby the voltage control apparatus detects the voltage that is being supplied to the first electrical load.

From another aspect, with the voltage control apparatus including a switching element that is connected in series with the field winding, for repetitively interrupting the field current, the field winding is preferably connected between the switching element and the ground potential of the system. As a result, it can be ensured that when the switching element is set in the open-circuit condition, both ends of the field winding are connected to ground potential. This serves to prevent a high voltage difference from appearing between the ends of the field winding, thereby assisting in preventing corrosion, and further enhancing reliability.

Moreover, the resistance of the field winding is preferably set at a value such that the field current is lower than a maximum allowable value of current of the switching element and is greater than one-half of that maximum allowable value, and wherein the voltage of the first voltage system is at least twice the voltage of the second voltage system. The reasons for this are as follows. With a prior art system such as that of the Japanese patent described hereinabove, in which field current may be supplied at certain times from the first voltage system and at other times is supplied from the second voltage system, it is necessary (from considerations of the level of field current that will flow when that current is being derived from the high supply voltage of the first voltage system) to set the resistance of the field winding at a value such that the maximum level of field current that flows when the field current is being derived from the low supply voltage will not exceed one half of the maximum allowable current rating of the switching element that controls the field current. However in the case of the present invention, in which the field current of the first electric generator is always supplied from the low supply voltage of the second voltage system, such a limitation does not apply, so that the resistance of the field winding can be made low, and a high level of field current can thereby flow, to achieve a high value of generated electrical power from the first electric generator.

In addition, since the field winding can also have a low value of inductance, levels of electrical noise and voltage surges in the output supply voltage of the generator can be made small.

Moreover, a vehicle-mounted electrical generating system according to the present invention is typically configured with the first voltage system being made up of equipment having voltage ratings of at least 28 V, and with the second voltage system made up of equipment having voltage ratings of approximately 14 V (i.e., the usual approximate level of battery voltage/generator voltage of a conventional motor vehicle). Thus it is possible to configure a vehicle-mounted electrical generating system by using equipment having specifications that are substantially unchanged from equipment used in the prior art, so that increases in manufacturing cost can be avoided and compatibility with prior art equipment can be maintained.

DESCRIPTION OF PREFERRED EMBODIMENTS

First Embodiment

Figure 1:
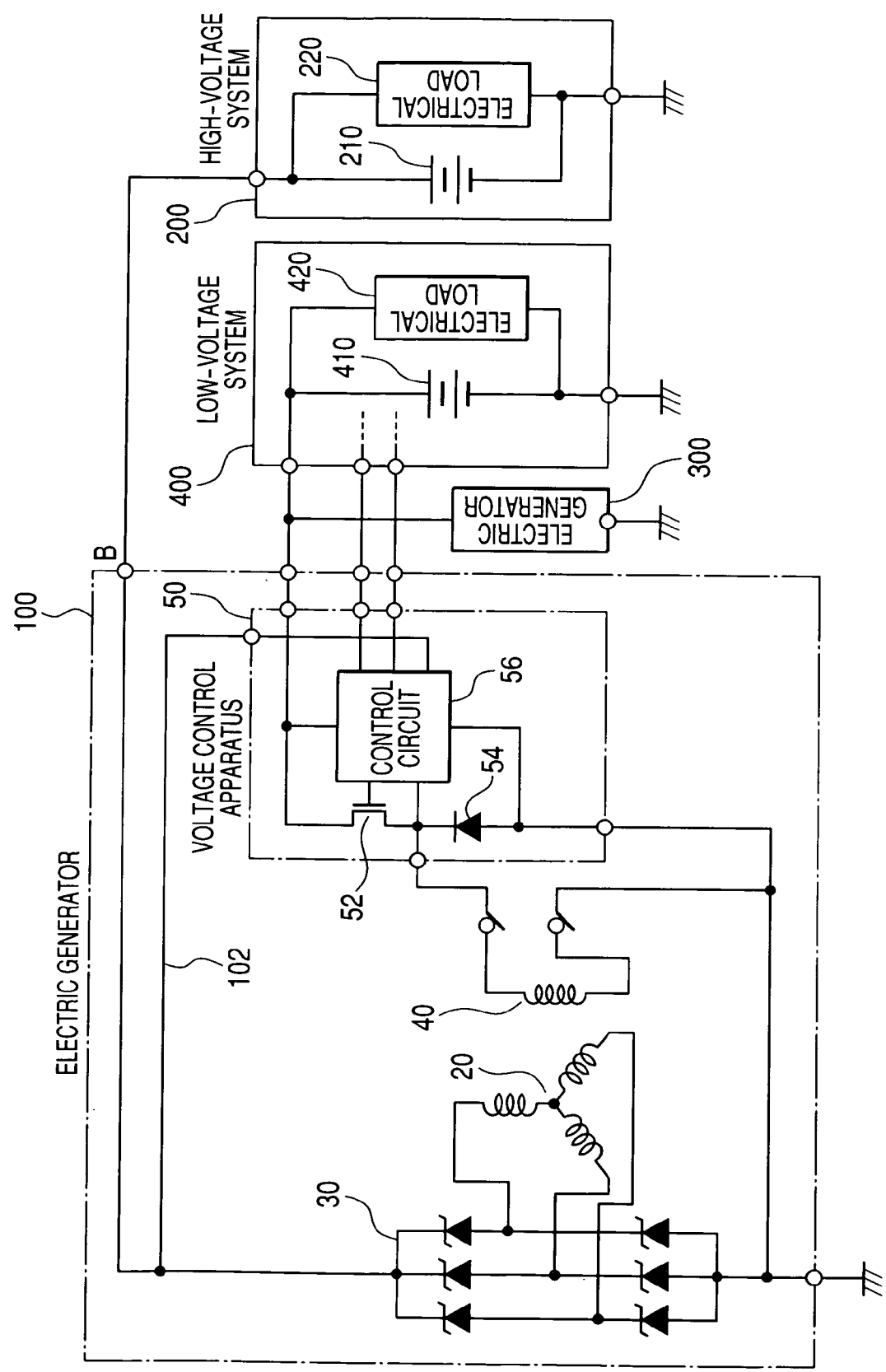
FIG. 1 shows the overall system configuration of a first embodiment of a vehicle-mounted electrical generating system.

FIG. 1 is a system diagram shows the overall configuration of a first embodiment of a vehicle-mounted electrical generating system, which includes an electric generator 100, a high-voltage system 200, an electric generator 300 and a low-voltage system 400. The electric generator 100 includes an alternator having a 3-phase armature winding 20 and a field winding 40, which is rotated by an engine of the vehicle (not shown in the drawings). The high-voltage system 200 includes a battery 210 and an electrical load 220, and operates at a DC supply voltage of 28 V or more, which is produced by the electric generator 100, transferred from the B terminal of the electric generator 100 to the high-voltage system 200 as shown in FIG. 1. The low-voltage system 400 includes a battery 410 and an electrical load 420. The electric generator 300 is also driven by an engine of the vehicle. The electric generator 300 produces a DC supply voltage of the low-voltage system 400, at a rated value of 14 V, for charging the battery 410 and supplying the electrical load 420.

The electric generator 300 and low-voltage system 400 in combination correspond to the electrical generating system of a conventional motor vehicle.

Figure 2:
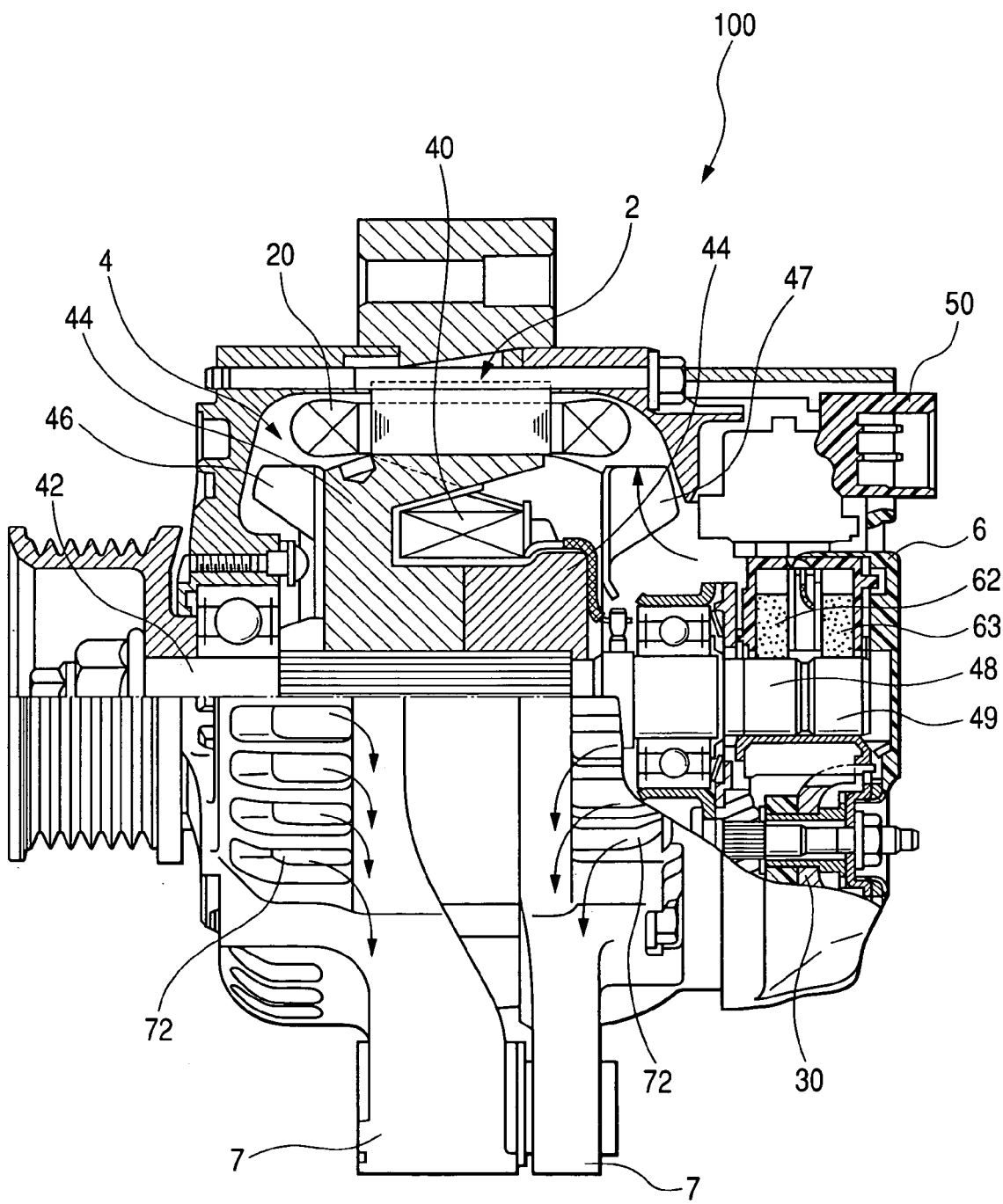
FIG. 2 is a cross-sectional view of an electric generator which supplies operating power to a high-voltage system of the electrical generating system of FIG. 1.

FIG. 2 is a cross-sectional view of the electric generator 100. As can be understood from FIGS. 1 and 2, the alternator of the electric generator 100 has an armature 2 with the armature winding 20 wound thereon, and a rotor 4 carrying the field winding 40, that is rotatably supported within an inner circumference of the armature 2, for inducing an AC magnetizing force in the armature winding 20 by producing a rotating magnetic field. The electric generator 100 further includes a 3-phase rectifier circuit 30 formed of six zener diodes, for rectifying the 3-phase AC voltage produced by the armature winding 20, a brush assembly 6 which transfers field current that flows through the field winding 40, a rotor shaft 42 of the rotor 4, and the voltage control apparatus 50 which controls the level of output voltage produced by the electric generator 100.

In addition to the rotor shaft 42, the rotor 4 includes a rotor core 44 having the field winding 40 wound thereon, cooling fans 46, 47 that are mounted at axially opposing ends of the rotor core 44, and slip rings 48, 49 that are disposed close to an outer end of the rotor shaft 42.

When the rotor 4 is rotated, the cooling fans 46, 47, which are fixedly attached to the rotor 4, are rotated thereby, so that a flow of cooling air is drawn along an axial direction and is ejected through peripherally located apertures 72 in the frame 7. The brush assembly 6 includes a pair of brushes 62, 63 which are respectively in sliding contact with the slip rings 48, 49, with the field winding 40 being supplied with field current (at a level controlled by the voltage control apparatus 50) via the brushes 62, 63 and the slip rings 48, 49.

The voltage control apparatus 50 includes a FET (field effect transistor) 52 functioning as a switching element, that is connected in series with the field winding 40, a reverse current bypass diode 54 that is connected in parallel with the field winding 40, a control circuit 56 which controls on/off switching of the switching element 52, with the duty ratio of that switching being adjusted by the voltage control apparatus 50 to thereby correspondingly adjust the DC output voltage produced by the electric generator 100 (from the aforementioned B terminal) to a specific value.

The voltage control apparatus 50 is supplied with operating power from the low-voltage system 400, i.e., at the low voltage of approximately 14 V that is supplied to the battery 410 and the electrical load 420 of the low-voltage system 400. The line indicated by numeral 103 in FIG. 1 denotes an element (i.e., connecting lead, etc.) that forms an electrical connection, within the interior of the electric generator 100, between the positive output end of the rectifier circuit 30 and the B output terminal of the electric generator 100. It is a specific feature of this embodiment that a connecting lead 102, which is also sealed within the interior of the electric generator 100, is coupled between the connection element 103 and an input terminal 55 of the voltage control apparatus 50. The voltage appearing on the connecting lead 102 (that is, the output voltage from the B terminal is compared by the voltage control apparatus 50 with the aforementioned specific value of output voltage of the electric generator 100, and the duty ratio of the successive on/off switching performed by the switching element 52 is adjusted in accordance with any deviation from the required output voltage value.

One end of the field winding 40 is connected to the ground potential of the system, while the other end is connected via the switching element 52 to the positive supply voltage of the low-voltage system 400.

Since as described above the low-voltage system 400 corresponds directly to the vehicle-mounted electrical generating system of a conventional motor vehicle, a device such as an ECU (Electronic Control Unit) that is widely used in the prior art for controlling a vehicle electrical generating system can be directly used to control the low-voltage system 400, i.e., for maintaining the output voltage of the electric generator 300 at a suitable level for charging the battery 410 and for supplying the electrical load 420 and also supplying operating power to the voltage control apparatus 50, with no change being required in the specifications of such an ECU, etc., from those of the prior art.

The resistance of the field winding 40 of the electric generator 100 is set to a value such that the maximum level of field current is lower than the maximum allowable current rating of the switching element 52, and is more than one half of that maximum allowable current rating. If as in the prior art the field current were to be supplied at certain times from the low-voltage system 400 (i.e., when the speed of rotation of the vehicle engine is low) and at other times from the supply voltage of the high-voltage system 200 (whose value is more than twice that of the supply voltage of the low-voltage system 400) it would be necessary to set the resistance of the field winding 40 such that when the field current is being derived from the supply voltage of the low-voltage system, the maximum value of field current is be no greater than half of the maximum allowable current rating of the switching element 52. However with this embodiment of invention, in which the field current of the field winding 40 is always supplied from the supply voltage of the low-voltage system 400, such a limitation is not imposed. Thus, the resistance of the field winding 40 can be made low.

Moreover, due to the low levels of voltage that are applied to the field winding 40 of this embodiment, and hence are applied to components such as the brushes 62, 63 and the slip rings 48, 49 which are exposed to the atmosphere, these components are less subject to corrosion, i.e., the electric generator 100 has increased resistance to adverse effects of the operating environment, so that enhanced reliability can be achieved. This is especially important when cooling fans are utilized, such as the fans 72 of this embodiment, which draw a flow of air through the interior of the electric generator 100 and so expose the brushes 62, 63 and the slip rings 48, 49, etc., to increased levels of dust and corrosive gases that will generally be present in the ambient atmosphere of the electric generator 100 (i.e., within the engine compartment of a vehicle). As described hereinabove, corrosion of the exposed components is accelerated when these are held at a high potential.

Furthermore, due to the fact that the resistance of the field winding 40 can be made low, irrespective of the output voltage produced by the electric generator 100, high levels of field current can flow in the field winding 40. That is to say, for the same value of ampere-turns of magnetizing force, the number of turns in the field winding 40 can be reduced and the field current correspondingly increased, by comparison with a field winding that has a greater number of turns and so a higher value of resistance. Hence, as a result of the increased level of field current, a higher value of output power can be produced by the electric generator 100.

Moreover, since the number of turns of the field winding 40 can be reduced, the inductance is correspondingly lowered. Hence, a reduction can be achieved in the level of electrical noise contained in the output voltage of the electric generator 100, and in the amplitude of voltage surges that occur each time the load 220 is disconnected or is suddenly reduced in level while a high value of current is being supplied from the electric generator 100.

Furthermore as described above, the internal connecting lead 102 whereby the voltage control apparatus 50 monitors the voltage output voltage from the B terminal of the electric generator 100 and regulates the field current of the field winding 40 accordingly, is sealed within the interior of the physical structure (illustrated in FIG. 2) which constitutes the electric generator 100, and so is not subjected to damage caused by being exposed to the atmosphere. The overall resistance of the electric generator 100 to adverse environmental conditions is thereby further enhanced.

Moreover due to the fact that the field winding 40 is connected between the switching element 52 and ground potential, each time that the switching element 52 is set in the open-circuit state, so that current flows through the bypass diode 54, both ends of the field winding 40 become connected to ground potential. This serves to prevent corrosion of those parts of the field winding 40 that are exposed to the atmosphere, by eliminating a voltage difference between the ends of the field winding 40. The overall resistance of the electric generator 100 to adverse environmental conditions is thereby further enhanced.

Second Embodiment

Figure 3:
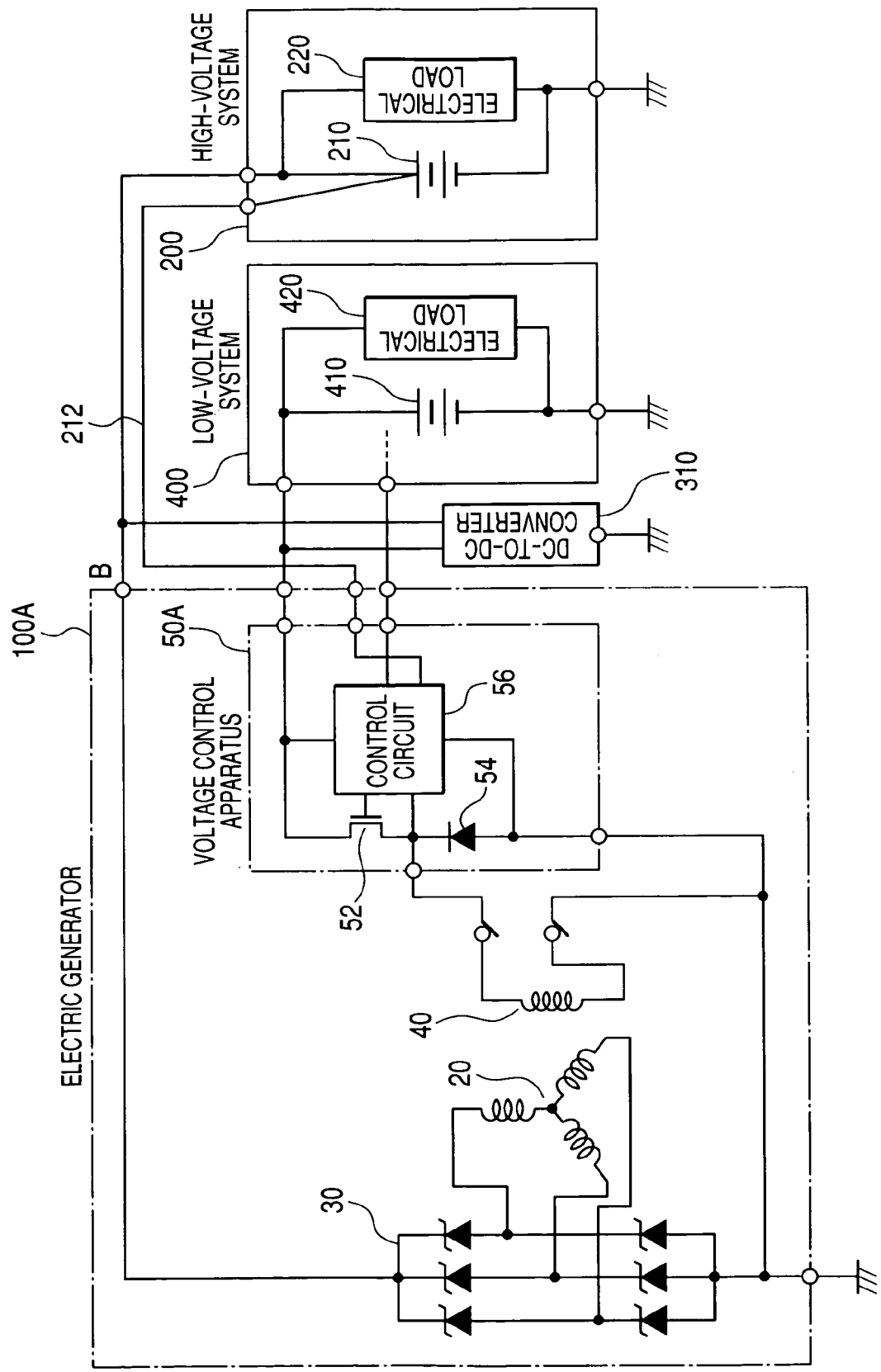
FIG. 3 shows the overall system configuration of a second embodiment of a vehicle-mounted electrical generating system.

It should be noted that the invention is not limited to the above embodiment, and that various modifications or alternative configurations could be envisaged. A second embodiment will be described in the following referring to FIG. 3 whereby, instead of the voltage control apparatus 50 detecting the output (B terminal) voltage of the electric generator 100 via a connecting lead that is sealed within the electric generator 100 as in the first embodiment, the voltage control apparatus 50A of an electric generator 100A of this embodiment detects the actual voltage that is being supplied to operate the high-voltage system 200 from the electric generator 100, i.e., that is being applied to the battery 210 and load 220. That voltage is monitored via an external connecting lead 212 which is coupled between an output terminal 211 of the high-voltage system 200 and an input terminal 105 of the electric generator 100A, with the output terminal 211 being directly connected to the positive terminal of the battery 210 (i.e., directly connected to the positive-voltage side of the electrical load 220) of the high-voltage system 200 and with the input terminal 105 being connected within the electric generator 100A to the control circuit 56 of the voltage control apparatus 50A. The control circuit 56 of this embodiment thus compares the actual supply voltage of the high-voltage system 200 with a required specific value of that supply voltage, and controls the switching element 52 accordingly.

It will be understood that with this second embodiment, increased accuracy of detecting the supply voltage of the high-voltage system 200 can be achieved, so that greater accuracy of controlling that supply voltage can be achieved.

With this embodiment, the electrical connection between the input terminal 105 of the electric generator 100A and the external connecting lead 212 is implemented by a sealed connector. This ensures that components of the voltage control apparatus 50A will not become exposed to the ambient atmosphere, and thereby prevents the overall resistance of the electric generator 100A from being lowered by the adverse effects of the environment due to the use of the external connecting lead 212.

With the second embodiment, the DC supply voltage of the low-voltage system 400 is produced by a DC-to-DC converter 310. The DC-to-DC converter 310 is connected to receive the supply voltage of the high-voltage system 200, and to convert that to the requisite value of supply voltage of the low-voltage system 400.

With that configuration, in which the DC-to-DC converter 310 provides the DC supply voltage for the low-voltage system 400 and also for the voltage control apparatus 50A, a lower manufacturing cost can be achieved, since the electric generator 300 of the first embodiment is eliminated and the overall system is simplified.

Third Embodiment

In some vehicle installations, there may be a possibility of occurrence of a partial or complete disconnection condition of the external connecting lead 212, or the connecting lead between the high-voltage system 200 and the B terminal the electric generator 10A. If this occurs, there may be a loss of control of the electric generator 100A, and an excessively high voltage may be generated. Hence, in the case of an installation in which the reliability of the external wiring of the electric generator 100A cannot be absolutely guaranteed, it is preferable to modify the second embodiment described above. For that reason, with a third embodiment, both the sealed internal connecting lead 102 of the first embodiment shown in FIG. 1 and the external connecting lead 212 of the second embodiment are both incorporated. In that way, the voltage control apparatus of the third embodiment can monitor both the actual supply voltage of the high-voltage system 200 and also the voltage appearing at the B terminal of the high-voltage generator 100 (100A).

During normal operation, the field current of the field winding 40 is controlled such as to maintain the actual supply voltage of the high-voltage system 200, obtained from the external connecting lead 102, at the desired specific value as described for the second embodiment. However with the third embodiment, the voltage control apparatus of the high-voltage generator 100 (10A) has an additional function, of comparing the voltage received from the external connecting lead 212, supplied to a first input terminal of the voltage control apparatus 50 (50A), with the voltage appearing at the B terminal (i.e., the potential of the internal connecting lead 102), supplied to a second input terminal of that voltage control apparatus. If these voltages are found to differ by more than a predetermined small amount, then this indicates a partial or complete disconnection (open-circuit) condition of one or both of the external connecting lead 212 and the external connecting lead between the B terminal and the high-voltage system 200. In that case, an appropriate predetermined mode of control is applied.

Since the system configuration of the third embodiment will be apparent from the above descriptions of the second and third embodiments, detailed description is omitted.

Each of the above embodiments has been described for the case in which the high-voltage system 200 incorporates a battery 210 that is connected in parallel with the electrical load 220, so that a substantially fixed value of supply voltage is utilized by the high-voltage system 200. However the invention is equally applicable to a vehicle-mounted electrical generating system in which no battery is incorporated in the high-voltage system, and in which the output voltage of the corresponding electric generator varies over a wide range, from high to low values. In such a case too, in the same way as for the above embodiments, the field current of the field winding 40 is derived from the supply voltage of the low-voltage system, and so is independent of variations in the supply voltage of the high-voltage system. Thus, the specifications of the field winding 40 can be set such that the field current varies within a range which is optimally close to the saturation condition, as for the described embodiments.

What is claimed is:

1. A vehicle-mounted electrical generating system comprising:
   a first voltage system which operates from a high supply voltage,
   a second voltage system which operates from a low supply voltage,
   an electric generator, having a rotor with a field winding wound thereon, said rotor being driven for rotation to generate electrical power that is supplied to said first voltage system at said high supply voltage, and
   a voltage control apparatus which effects successive on/off switching of a field current of said field winding, for controlling said supply voltage of said first voltage system to a predetermined value;
   wherein said voltage control apparatus operates from electrical power at said low supply voltage of said second voltage system, and wherein said field current is derived from said low supply voltage of said second voltage system.

2. A vehicle-mounted electrical generating system according to claim 1, said electric generator including an output terminal from which said electrical power of said electric generator is supplied at said high supply voltage to said first voltage system, wherein said voltage control apparatus is connected to said output terminal via an internal connecting lead of said electric generator, and wherein said voltage control apparatus applies control to maintain a voltage appearing on said internal connecting lead at a predetermined value.

3. A vehicle-mounted electrical generating system according to claim 1, wherein an input terminal of said voltage control apparatus is connected to an electrical load of said second voltage system via an external connecting lead, and wherein said voltage control apparatus applies control to maintain a supply voltage of said electrical load, applied from said external connecting lead to said input terminal, at a predetermined value.

4. A vehicle-mounted electrical generating system according to claim 1, wherein said voltage control apparatus comprises a switching element that is connected in series with said field winding, for repetitively interrupting said field current, and wherein said field winding is connected between said switching element and a ground potential.

5. A vehicle-mounted electrical generating system according to claim 4, wherein a value of resistance of said field winding is set at a value such that said field current is lower than a maximum allowable value of current of said switching element and is greater than one-half of said maximum allowable value, and wherein said voltage of said first voltage system is at least twice said voltage of said second voltage system.

6. A vehicle-mounted electrical generating system according to claim 1, wherein said first voltage system is constituted by equipment having a rated voltage value that is at least 28 V, and wherein said second voltage system is constituted by equipment having a rated voltage value that is substantially equal to 14 V.

7. A vehicle-mounted electrical generating system according to claim 1, wherein:
   said electric generator includes an output terminal from which said electrical power of said electric generator is supplied to said first voltage system via a first external connecting lead;
   a first input terminal of said voltage control apparatus is connected to said output terminal via an internal connecting lead of said electric generator;
   a second input terminal of said voltage control apparatus is connected to an electrical load of said second voltage system via a second external connecting lead;
   said voltage control apparatus applies control to maintain a supply voltage of said electrical load, appearing on said external connecting lead, at a predetermined value; and
   said voltage control apparatus compares respective voltages appearing on said first and second input terminals thereof, for detecting a disconnection condition of either of said first external connecting lead and second external connecting lead.

* * * * *